United States Patent
Vidal-Naquet

(10) Patent No.: US 8,957,984 B2
(45) Date of Patent: Feb. 17, 2015

(54) GHOST ARTIFACT DETECTION AND REMOVAL IN HDR IMAGE PROCESSSING USING MULTI-SCALE NORMALIZED CROSS-CORRELATION

(71) Applicant: Konica Minolta Laboratory U.S.A., Inc., San Mateo, CA (US)

(72) Inventor: Michel Julien Vidal-Naquet, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 38 days.

(21) Appl. No.: 13/931,984

(22) Filed: Jun. 30, 2013

(65) Prior Publication Data

US 2015/0002704 A1    Jan. 1, 2015

(51) Int. Cl.
*H04N 5/228* (2006.01)
*H04N 5/235* (2006.01)

(52) U.S. Cl.
CPC ............ *H04N 5/2355* (2013.01); *H04N 5/2356* (2013.01)
USPC ................... 348/222.1; 348/218.1; 348/239; 348/362

(58) Field of Classification Search
USPC .......................................... 348/362; 382/254
See application file for complete search history.

(56) References Cited

U.S. PATENT DOCUMENTS

| | | | |
|---|---|---|---|
| 7,142,723 B2 * | 11/2006 | Kang et al. ................... | 382/254 |
| 7,612,804 B1 * | 11/2009 | Marcu et al. ............... | 348/222.1 |
| 8,150,201 B2 * | 4/2012 | Kasai et al. .................. | 382/274 |
| 8,237,813 B2 * | 8/2012 | Garten ........................ | 348/229.1 |
| 8,724,821 B2 * | 5/2014 | Ohashi .......................... | 381/63 |
| 2011/0188744 A1 | 8/2011 | Sun | |
| 2012/0105681 A1 * | 5/2012 | Morales ........................ | 348/239 |
| 2012/0218442 A1 * | 8/2012 | Jandhyala et al. ............. | 348/239 |
| 2012/0242794 A1 * | 9/2012 | Park et al. ....................... | 348/46 |

OTHER PUBLICATIONS

Srikantha et al., "Ghost Detection and Removal for High Dynamic Range Images: Recent Advances", Signal Processing: image Communications, pp. 1-23, 2012.

* cited by examiner

*Primary Examiner* — Hung Lam
(74) *Attorney, Agent, or Firm* — Chen Yoshimura LLP

(57) ABSTRACT

A method for detecting ghost artifact in multiple images during high dynamic range (HDR image creation. For each pair of images, multiple individual consistency maps are generated by calculating a consistency function using moving windows of different sizes. The individual consistency maps are combined into a combined consistency map and then binarized. When combining the multiple individual consistency maps, they are first binarized using predetermined threshold values that are window-size-specific. The threshold values are developed beforehand using training images and machine leaning. The final binarized consistency map indicates whether the pair of images are consistent with each other at each pixel location. Then, a ghost-weight map is generated for each image based on the multiple final consistency maps. The ghost-weight map indicates the likelihood of each image pixel being ghost-inducing. The HDR image is generated using the set of images and the corresponding ghost-weight maps.

23 Claims, 5 Drawing Sheets

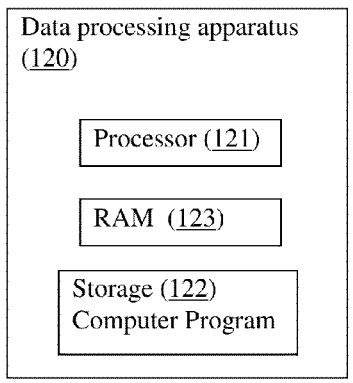
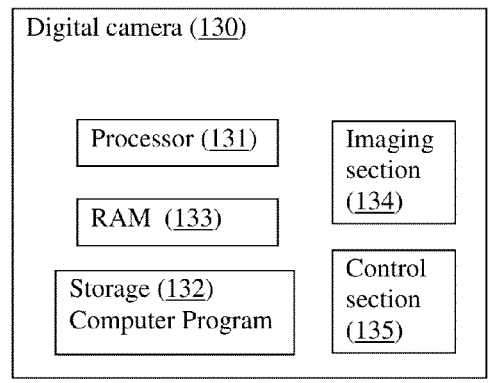
Fig.8A
Fig.8B

GHOST ARTIFACT DETECTION AND REMOVAL IN HDR IMAGE PROCESSSING USING MULTI-SCALE NORMALIZED CROSS-CORRELATION

BACKGROUND OF THE INVENTION

1. Field of the Invention

This invention relates to high dynamic range (HDR) imaging, and in particular, it relates to removal of ghost artifact during HDR image creation.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels, and then digitally merging the multiple images to create an HDR image that contains information from the original multiple images, so that details in both brighter and darker areas are adequately expressed in the HDR image. Methods for creating an HDR image from multiple images are generally known.

Bracketing is a technique in photography for taking multiple images of the same scene using different exposure levels or other different setting values such as focus, depth of field, etc. Some cameras can perform autobracketing, i.e., automatically changing the setting multiple times and take multiple images. Each of the multiple images is sometimes referred to as a bracket. Multiple images generated by exposure bracketing can be used to create HDR images.

During HDR image creation, ghosting artifacts can appear when object have moved, appeared or disappeared in between the shooting of the different images (brackets). For example, during the shooting of three brackets, if a person walks into the scene only in the third bracket, then the HDR image created from the three brackets will have a semi-transparent figure of the person over the scene ("ghost").

Methods have been proposed to identify such ghost-inducing objects within the multiple images, so that the images can be processed to reduce or eliminate ghosting effects in the resulting HDR image. For example, some known techniques for ghost removal use windows to compare brackets locally. Some of these techniques are described in a review paper, A. Srikantha and D. Sidibé, Ghost Detection and Removal for High Dynamic Range Images: Recent Advances, Signal Processing: image Communications, 27(6), pp. 650-662, 2012. U.S. Pat. Appl. Pub. No. 2011/0188744 describes a method for ghost artifact removal using a normalized cross-correlation (NCC) technique. In these known methods, corresponding local regions (windows) of different images are compared, and if the contents of the windows are deemed too un-similar, the region may be deemed to involve moving subjects. Because different brackets by design have different exposures (light intensities) and therefore different pixel values for the same pixel locations, the comparison techniques should be insensitive to the overall light intensity.

SUMMARY

Each of the above-mentioned known ghost detection techniques uses windows of a single, fixed size to compare the images. They typically use small windows, such as 7×7, 11×11 pixels, etc. One disadvantage of small windows is that they are sensitive to noise. Another disadvantage is that they are not sensitive to certain types of differences between brackets, for example, where a relatively feature-less area in one bracket is replaced in another bracket by another relatively feature-less area. For example, a white ball that rolls onto a lawn. If the window is relatively small and located entirely within the ball, then the change may not be detected because the comparison algorithm is not sensitive to change in overall light intensity. Conversely, if only large windows are used, small ghost-inducing regions may not be detected.

The present invention is directed to an improved method and related apparatus for detecting potential ghost-inducing regions within the multiple images, so that they can be removed or otherwise treated to reduce or eliminate ghosting effects in HDR image creation. In particular, the method is well suited for the ghost artifact detection and removal in the case of three brackets.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image from a set of multiple images at different exposure levels, which includes: for each pair of images of the set of images: (a) generating a plurality of individual consistency maps for the pair of images, each individual consistency map being generated by calculating a consistency function between a pair of moving windows having a window size and located respectively in the pair of images, the plurality of individual consistency maps being generated using a plurality of different window sizes; (b) combining the plurality of individual consistency maps to generate a combined consistency map for the pair of images; and (c) binarizing the combined consistency map to generate a final consistency map for the pair of images, wherein each pixel in the final consistency map has a pixel value indicating whether or not the pair of images are consistent with each other at a location corresponding to that pixel; whereby a plurality of final consistency maps are generated, one for each pair of images; (d) for each image of the set of images, generating a ghost-weight map based on the plurality of final consistency maps, wherein each pixel in the ghost-weight map has a pixel value indicating a likelihood of an image pixel at a corresponding location of the image being ghost-inducing; and (e) generating the HDR image using the set of images and the corresponding ghost-weight maps.

Optionally, in step (a), the plurality of individual consistency maps include individual consistency maps generated for color versions of the pair of images and black and white versions of the pair of images. Optionally, in step (a), the consistency function is a normalized cross-correlation (NCC) function.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another method, the present invention provides a digital camera which includes the computer usable non-transitory medium described above, and further includes an imaging section for obtaining images; a control section for controlling the imaging section to obtain a set of images having different exposure levels.

It is to be understood that both the foregoing general description and the following detailed description are exemplary and explanatory and are intended to provide further explanation of the invention as claimed.

BRIEF DESCRIPTION OF THE DRAWINGS

FIGS. 8A and 8B schematically illustrate a data processing apparatus and a camera, respectively, in which embodiments of the present invention may be implemented.

DETAILED DESCRIPTION OF PREFERRED EMBODIMENTS

Embodiments of the present invention provide a method for detecting ghost artifact in multiple images for HDR image creation. The multiple images (brackets) are obtained by photographing the same scene at different exposure levels. It is assumed that the camera does not move substantially during the photographing process; however, objects may move within the scene, or appear into or disappear from the scene during the process. Such objects are collectively referred to as moving objects in this disclosure. If untreated, the moving objects will induce ghost artifact in the resulting HDR image. The ghost artifact detection method identifies areas of the images that contain such moving objects that may induce ghost artifact. It should be noted that although the method is referred to as a ghost artifact detection method, it does not detects ghost artifacts in an HDR image after it has been created. Rather, the method detects regions in the original multiple images that, if untreated, will induce ghost artifacts in the HDR image.

Similar to the known techniques mentioned above, the ghost artifact detection method according to embodiments of the present invention compares local regions in pairs of images using moving windows. A comparison function such as normalized cross-correlation (NCC), or other suitable functions, is used to evaluate the similarity between pairs of corresponding windows. Unlike the know techniques, the method described here uses moving windows of multiple different sizes. The comparison results from windows of multiple sizes are combined, which enables the detection of large and small regions that will induce ghost artifacts.

NCC is a standard measure that is invariant to changes in contrast and mean luminosity. It has been used in the computer vision field to compare images. An assumption in using NCC for ghost artifact detection is that a pair of windows at the same location in two different brackets will have a high NCC value if there was no content change in the scene at that location, despite the difference in exposure levels of the two brackets. If there was a change in image content between the shooting of two brackets, then the image windows will differ and the NCC value will be relatively low. Therefore, a low NCC value is evidence for a ghost-inducing region.

Figure 6:
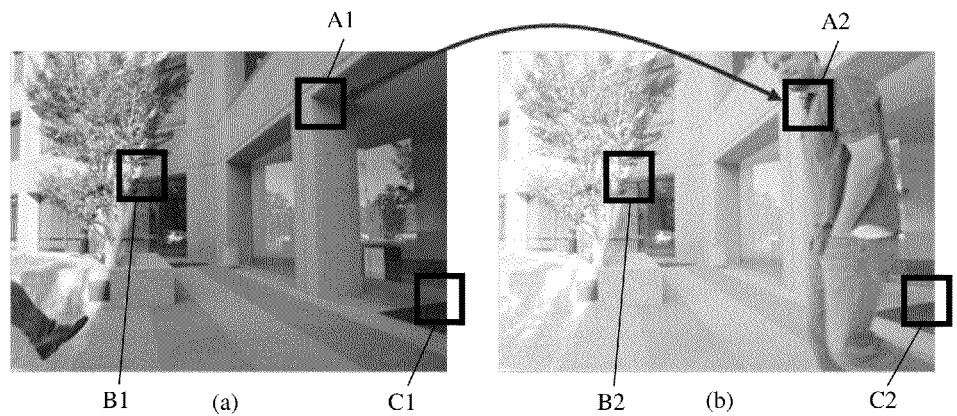
FIG. 6 shows two exemplary images illustrating the ghosting artifact.

As an example, FIG. 6 illustrates two images, with image (a) having a lower exposure and image (b) having a higher exposure. In image (b), a person walks into the scene from the right. For the pair of windows A1 and A2, the NCC value is expected to be relatively low. For the pair of windows B1 and B2, the NCC value is expected to be relatively high.

A method for detecting ghost artifact in multiple images for HDR image creation according to an embodiment of the present invention is described with reference to FIG. 1. In the description below, NCC is used as a function that indicates the similarity or consistency (these two words are used interchangeably in this disclosure) of the image, but other suitable functions may be used. More generally, the function (e.g. NCC) may be referred to as a consistency function, and the maps described below (e.g. NCC maps) may be referred to as consistency maps.

It is assumed that all images in the set of original images of the scene, taken at different exposures, are of the same size. Scaling may be performed beforehand if the original images are not of the same size. As an optional and preliminary step, each image in the image set may be re-sized to a smaller size while maintaining the aspect ratio. For example, the images may be re-sized to 750 pixels in the short direction, which enables a faster computation without losing significant information.

Figure 1:
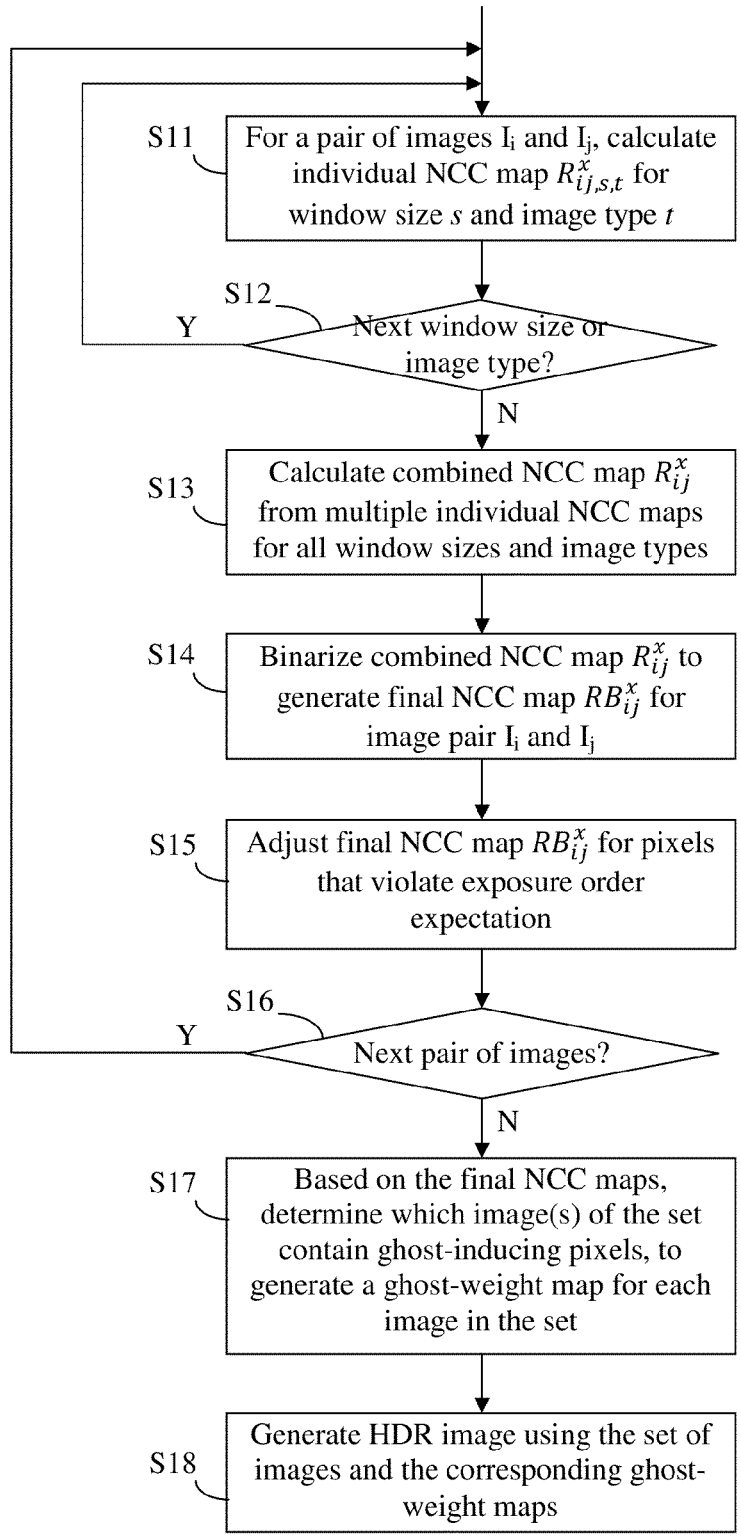
FIG. 1 schematically illustrates a method for generating an HDR image using multiple brackets while detecting and removing ghosting artifacts according to an embodiment of the present invention.

Steps S11 to S15 in FIG. 1 are performed for each pair of images $I_i$ and $I_j$ among the set of images to compute a combined NCC map for the pair. i and j are indices of the images and their value range from 1 to M, where M is total number of images in the set. First, individual NCC maps $R_{i,j,s,t}^x$ for window size s and image type t are calculated (step S11). The individual NCC maps have the same size as the images. Here, x is a 2D pixel position of the image which is located the center of the window, s is an index of the window size (also referred to as scale), and t represents an image type (also referred to as modality), being either a black and white image type or color image type. The black and white image is derived from the color version of the image if the images are originally in color. Any suitable method can be used to accomplish this. If the images are originally in black and white, then individual NCC maps for only the black and white type will be calculated. In one implementation, 6 or 7 window sizes are used; the largest window is approximately ¼ of the image, and the smallest may be 7 by 7 pixels.

Mathematically, the NCC between any two image patches (windows) X and Y of the same size is given by the following formula (Eq. 1):

$$NCC(X, Y) = \frac{\sum_{i=1}^{N}(X_i - \overline{X})(Y_i - \overline{Y})}{\sqrt{\left(\sum_{i=1}^{N}(X_i - \overline{X})^2 \sum_{i=1}^{N}(Y_i - \overline{Y})^2\right)}}$$

where $$\overline{X} = \frac{1}{N}\sum_{i=1}^{N} X_i$$

and $$\overline{Y} = \frac{1}{N}\sum_{i=1}^{N} Y_i.$$

For a black and white image, N equals the number of pixels in the image window and the sums are performed over the N pixels. In the case of color images, the sums are performed over all corresponding R, G, B components of the pixels in the window; i.e., N equals 3 times the number of pixels in the image window. The NCC value calculated from Eq. 1 ranges from −1 to 1, with higher values indicating higher similarity (consistency) between the two windows.

NCC has the property that NCC(X, aY+b)=NCC (X, Y), where a and b are constants. Thus, NCC is invariant to changes in exposure level and contrast, as mentioned earlier.

To calculate an individual NCC map $R_{i,j,s,t}^{x}$ in step S11, for each 2D pixel position x of the image, an NCC value is calculated using Eq. 1, where windows X and Y are the windows of size s centered at position x in images $I_i$ and $I_j$. The NCC values as a function of position x form a 2D map.

For each pixel location x within the center area of (L−l+1)×(C−c+1) pixels of the images, where L and C are linear dimensions (e.g. width and height) of the image and l and c are the linear sizes of the window, full windows of size l×c centered at position x exist, and the NCC value for x can be calculated using Eq. 1 directly. However, for a pixel location within the border areas of widths (l−1)/2 and (c−1)/2, respectively, on the four sides, a full window of size l×c centered at position x does not exist. This is illustrated, for example, by windows C1 and C2 in FIG. 6. Therefore, the NCC values for locations x in the outer border are calculated using a modified method. Some alternative methods are described below.

In a first modified method for the border areas, incomplete (smaller) windows are used to calculate the NCC value for position x. The incomplete window is the overlapping area between the window centered at x and the image. For a pixel located exactly on an edge of the image, the incomplete window is approximately half the size of the regular windows. For a pixel located exactly at a corner of the image, the incomplete window is approximately a quarter of the size of the regular windows. Eq. 1 is applied to the incomplete windows by summing over all pixels in the incomplete windows.

Figure 2:
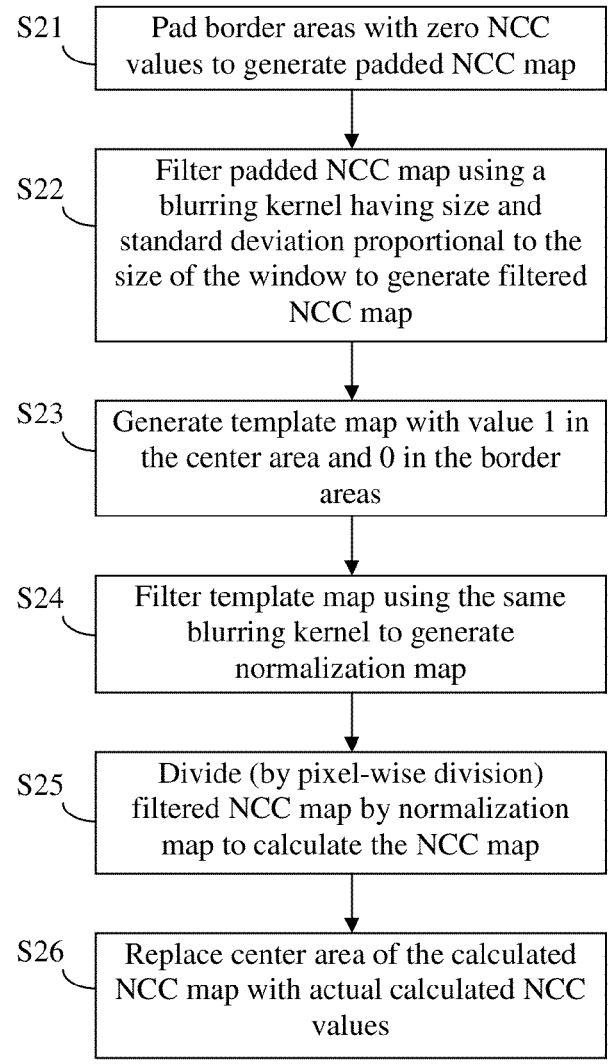
FIG. 2 schematically illustrates a method for scaling an individual consistency map according to an implementation of the method of FIG. 1.

In a second modified method for border areas, interpolation is used to calculate the NCC values in border areas, as shown in FIG. 2. First, the border area of the NCC map is padded with zero values (step S21), while the center area of (L−l+1)×(C−c+1) has the NCC values calculated from Eq. 1. Then, the padded map (of size L×C) is filtered with a blurring kernel (step S22). It should be noted that the edge areas of the padded map are filtered with incomplete blurring kernels, such as to obtain a filtered padded map of size L×C. Different blurring kernels are used for different window sizes, where the sizes and standard deviations of the blurring kernels are proportional to the window sizes. The filtered NCC map has the same size as the padded NCC map (and the original image). The filtered NCC map is then normalized.

Specifically, a normalization map is computed, by first generating a template map of size L×C (i.e. the same size as the original image), and which has values 1 in the center areas and value 0 in the border areas (step S23), and then filtering the template map using the same blurring kernel(s) as in the filter step S22 (step S24). Steps S23 and S24 may be performed off-line, i.e. not at the time of ghost artifact detection. The normalization map has the same size as the original images. Finally, a normalized filtered NCC map is calculated by dividing the filter NCC map by the normalization map using a pixel-wise division (step S25). This normalized filtered NCC map, having the size of the original image, can be used as the NCC map for window size s and type t.

Optionally, the center area of the normalized filtered NCC map can be replaced by the NCC values originally calculated from Eq. 1 (step S26). If this replacement step is carried out, then the calculations in the filtering steps S22, S24 and the dividing step S25 only need to be performed for pixels located in the border area. In this case, the replacement step S26 can also be viewed as a step of combining the center and border areas of the NCC map (rather than a replacing step).

While calculating the individual NCC maps in step S11, precaution should be taken to deal with windows that are essentially uniform. Examples may include blue sky, textureless surfaces, etc. The NCC function in Eq. 1 is un-defined if either window has a near zero standard deviation, due to division by zero. To determine whether a window X is a uniform window, its coefficient of variation (CoV) is calculated using the following definition (Eq. 2):

$$CoV(X) = \frac{std(X)}{mean(X)}$$

where sdt(X) is the standard deviation of the pixel values (including R, G, B components for color images) and mean (X) is the mean pixel value of the window. It should be noted that in color images, uniform will mean "gray". Areas with uniform colors that are not gray but of different colors will generally not have a low CoV.

If the CoV is below a threshold (e.g. 0.001 in one implementation), then the window is deemed "uniform". Eq. 1 is used to calculate NCC if both windows are non-uniform. The NCC value between two uniform windows is set to a value indicating "consistent", e.g. 1 in one implementation, and the NCC between a uniform and a non-uniform window is set to a value indicating "inconsistent", e.g. 0 or −1.

As calculated in step S11, the individual NCC maps $R_{i,j,s,t}^{x}$ for all window sizes and all image types have the same size as the size of the original images.

Figure 3:
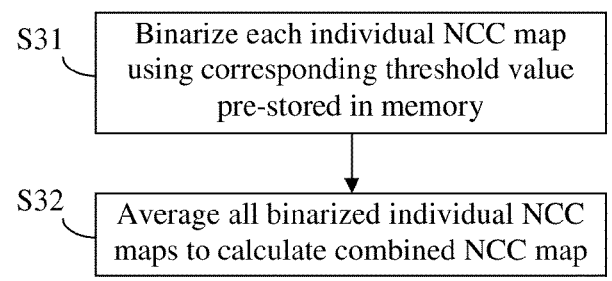
FIG. 3 schematically illustrates a method for combining multiple individual consistency maps for different scales and different image types to generate a combined consistency map according to an implementation of the method of FIG. 1.

Step S11 is repeated for all window sizes and image types ("Y" in step S12). Then, the multiple individual NCC maps of all window sizes s and image types t are combined to calculate a combined NCC map $R_{ij}^{x}$ (step S13). This calculation is described in more detail with reference to FIG. 3. First, each individual NCC maps $R_{i,j,s,t}^{x}$ is binarized using a corresponding threshold value $\theta_{s,t}$ to calculate a binarized individual NCC map (step S31). In other words, a pixel value of the binarized NCC map is 1 if the NCC value is equal to or greater than $\theta_{s,t}$, indicating the pair of window centered at that pixel location are consistent; and a pixel value of the binarized NCC map is 0 if the NCC value is less than $\theta_{s,t}$ indicating the pair of window centered at that pixel location are inconsistent. Note that the pixel values 1 and 0 of the binarized NCC map may be reversed (i.e. 0 to indicate inconsistent windows and 1 to indicate consistent windows); it is only a matter of definition.

Figure 5:
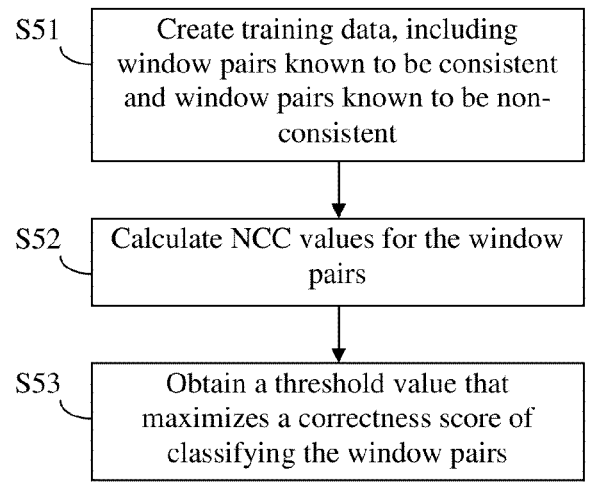
FIG. 5 schematically illustrates a method for generating binarization threshold values used in the method of FIGS. 1 and 3.

The threshold value $\theta_{s,t}$ for each NCC map of size s and type t is determined beforehand and stored in a memory, as will be described in more detail later (see FIG. 5 and accompanying descriptions). Optionally, for each window size and image type, different threshold values suitable for different types of scenes (beach, indoor etc.) are provided beforehand. Then, based on the type of scene being photographed, one of the threshold values is selected for use in step S31. The type of scene being photographed may be determined by the camera setting (e.g., the user can set the scene type on the camera prior to taking the photographs), or by using an automatic scene type detection algorithm.

Then, the binarized individual NCC maps for all window sizes and all image types are averaged to calculate the combined NCC map (step S32). Pixel-wise averaging is used; in other words, the pixel value for each pixel in the combined NCC map is an average of the pixel values of the corresponding pixels in all binarized individual NCC maps. This pixel value represents the average number of NCC maps that exceed the corresponding threshold at that pixel location.

Mathematically, the combined NCC map R may be expressed as follows (Eq. 3):

$$R_{ij}^x = \frac{1}{P} \sum_s \sum_t I(R_{ij,s,t}^x \geq \theta_{s,t})$$

where the summations are over all window sizes s and image types t, and P is the total number of window size and image type combinations (i.e. the product of the number of window sizes and the number of image types). I( ) represents the indicator function:

$$I(z) = \begin{cases} 0, & z \text{ is False} \\ 1, & z \text{ is True} \end{cases}.$$

As an alternative, a soft binarization may be used, such as by applying a type of sigmoid function. As another alternative to the method shown in FIG. 3 (less preferred), the combined NCC map may be generated by simply averaging the individual NCC maps, without first binarizing them.

The combined NCC map $R_{ij}^x$ represents the visual similarity between the two brackets $I_i$ and $I_j$, taking into consideration information from different scales (window sizes) and image types.

Referring back to FIG. 1, the combined NCC map $R_{ij}^x$ is binarized using a threshold value to generate a final NCC map $RB_{ij}^x$ for the image pair $I_i$ and $I_j$ (step S14). The threshold value may be determined empirically. In one implementation, the threshold value is 0.6. The final NCC map is a binary map where one pixel value (1 in this example) indicates consistent pixels (i.e. pixel not involved in a moving object) and the other pixel value (0 in this example) indicates inconsistent pixels (i.e. pixel involved in a moving object).

In an image set, the same pixels in different brackets are expected to have higher values in brackets of higher exposure. This expectation based exposure order may be violated in areas that involve moving objects. As has been suggested by others (see the above-mentioned paper by A. Srikantha, D. Sidibé), this fact can be used to mark pixels as inconsistent. In other words, an adjustment can be made based on a comparison of pixel values of corresponding pixels in the pair of images and a comparison of overall exposure levels of the pair of images (step S15). For example, the final NCC map $RB_{ij}^x$ can be adjusted by marking a pixel x as inconsistent if $I_i^x \geq I_j^x$ but is more exposed than $I_i$. This step is optional.

Steps S11-S15 are repeated for each pair of images of the image set (step S16). A total of M(M−1)/2 final NCC maps are produced as a result, where M is the number of images in the image set. The next step determines, for each pixel that is deemed inconsistent for any pair of images, which image(s) are to be treated as containing a moving object and which image(s) are to be treated as not containing the moving object (step S17). The designation of "moving object" vs. "the scene" may be somewhat arbitrary. For example, when a person is present in some images and not in some other images, the person may be intended as a part of the scene, or may have walked into a scene which is not intended to include the person. As a general matter, when the image set contains more than two images, it may be possible to determine which images contains a moving object based on the number of images that are consistent with one another. For example, if the image set contains 5 images, and the pairs of images among images 1, 2, 3, and 5 are all consistent with each other at particular pixel positions, while image pairs between image 4 and other images are all inconsistent at those pixel positions, then image 4 may be deemed to contain a ghost-inducing moving object at those pixel locations. The result of step S17 is a set of "ghost weight" maps $G_i^x$, one for each image $I_i$, which indicates whether each pixel x in that image is ghost-inducing or not.

Two exemplary methods are described below for calculating the ghost-weight maps.

A first method for calculating the ghost-weight maps is to define one image among the set of images as a reference image which by definition does not contain any ghost. If image i is selected as reference image, then the ghost-weight map for image i is zero, $G_i^x=0$, and $G_j^x=RB_{ij}^x$. Any image may be defined as the reference image, e.g., the first image, the last image, the image in the middle of the sequence of brackets, etc. Or, the image having the best exposure quality may be defined as the reference image. Best exposure quality may be defined as having the least number of saturated and/or underexposed pixels, or by some other measure. The selection of the reference image can be done by the user, or done automatically by the device (computer if the method is implemented as software executed by a computer, or camera if the method is implemented in a camera).

Figure 4:
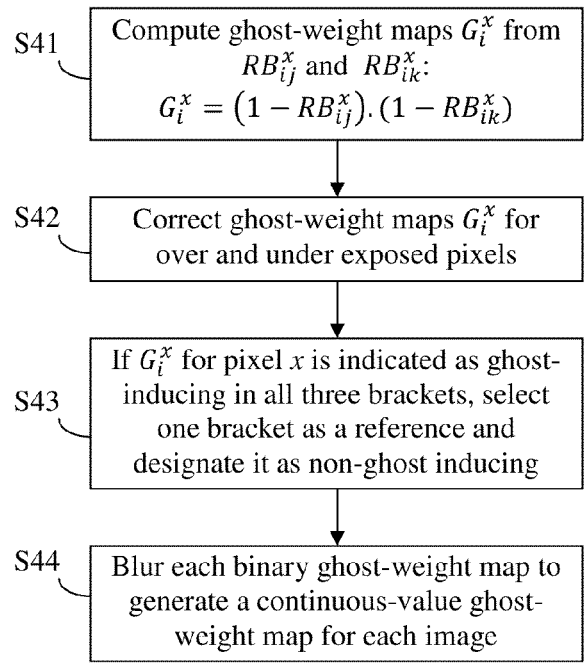
FIG. 4 schematically illustrates a method for calculating ghost-weight maps for the images according to an implementation of the method of FIG. 1.

A second method for calculating the ghost-weight maps, shown in FIG. 4, is particularly suited for a set of three images. This method is based on the observation that if one bracket is inconsistent with both of the two other brackets in the set at location x, e.g., consistency maps $RB_{ij}^x$ and $RB_{ik}^x$ are both equal to 0, then it is likely that location x of bracket $I_i$ is different from the content at that location in $I_j$ and $I_k$. Therefore, bracket $I_i$ will induce a ghost artifact at location x. The ghost-weight map $G_i^x$ is calculated from the relevant consistency maps based on this principle (step S41). In one particular implementation, the following equation is used (Eq. 4):

$$G_i^x = (1 - RB_{ij}^x) \cdot (1 - RB_{ik}^x)$$

In this equation, if both $RB_{ij}^x$ and $RB_{ik}^x$ are 0 (inconsistent), then $G_i^x$ is 1, indicating that pixel location x in bracket i will induce ghosting artifact. If either $Rb_{ij}^x$ or $Rb_{ik}^x$ is 1 (consistent), then $G_i^x$ is 0, indicating that pixel location x in bracket i will not induce ghosting.

Optionally, the ghost-weight maps $G_i^x$ may be corrected for the effect of under and over exposure (step S42). The image areas that are under or over exposed can lead to spurious ghost-inducing pixel detections because the pixel values of the same location across different images are no longer proportional to the exposure level, leading to low ("inconsistent") NCC values. Therefore, the ghost-weight map $G_i^x$ may be corrected by setting the pixel value to 0 (non-ghost) for over or under exposed pixels. In other words, such a pixel is not considered ghost-inducing even if its NCC value indicates inconsistency.

Note that the correction for over or under exposed pixels may alternatively be done by correcting the final individual NCC maps $RB_{ij}^x$ before calculating the ghost-weight map $G_i^x$. This alternative method is less preferred.

Using this method of Eq. 4, it is possible for a pixel to be marked ghost-inducing in all three brackets. For example, if a person walked into the scene in the second bracket, and moves to a different location in the third bracket, and the locations of the person in the second and third brackets overlap, then in the overlapping area, all three images will be inconsistent with one another, so the area will be marked as ghost-inducing for all three brackets. In such a situation, if the pixel in all brackets were suppressed in the image combination, it would lead to a black pixel in the resulting HDR image. Therefore, in one embodiment of the present invention, one bracket is selected as a reference bracket, and its ghost-weight value at that pixel which will be marked as non-ghost-inducing, i.e. $G_i^x=0$ if bracket i is the reference bracket (step S43). The algorithm for selecting the bracket to mark as non-ghost-inducing can be developed heuristically, for example: First, compute the number of non-overlapping ghost-inducing pixels for the three possible pairs of ghost-weight maps. Second, mark as "ghost" the pixel in the bracket that has the largest number of ghost pixels that are not ghost pixels in the two other brackets. Third, among the two remaining brackets, select the bracket with best overall exposure; mark the pixel of this best exposed bracket as "non-ghost", and mark the other as "ghost".

An alternative algorithm for selecting the bracket to mark as non-ghost-inducing may include: First, compute the number of non-overlapping ghost-inducing pixels for the three possible pairs of ghost-weight maps. Second, mark as "non-ghost" the pixels in the bracket that has the fewest number of ghost pixels that are not ghost pixels in the two other brackets, and mark the corresponding pixels in the other brackets as ghost.

After the various corrections are made, each binary ghost-weight map is blurred to generate a final ghost-weight map, which has continuous pixel values between 0 and 1 representing the likelihood of the pixel being ghost-inducing (step S44). One final ghost-weight map is generated for each image in the set.

Referring back to FIG. 1, after a final ghost-weight map is generated for each of the multiple images in the set, the HDR image is generated by using the multiple images and the corresponding multiple final ghost-weight maps (step S18). The contribution of each image pixel to the HDR image will depend on its ghost-weight. For example, a pixel in an image having a ghost-weight of 1 (ghost) may be completely suppressed in the HDR image generation; a pixel having a ghost-weight of 0 (non-ghost) may be fully used in the HDR image generation; and a pixel having a ghost-weight $G_i^x$ may have a contribution proportional to $(1-G_i^x)$. Methods of generating an HDR image from multiple images are generally known; any such method may be used to accomplish step S18, so long as the ghost-weight values are taken into consideration as described above. For example, the image fusion stage of HDR creation algorithms typically applies one or more multiplicative weights to image pixel values; the value $(1-G_i^x)$ may be applied as an additional multiplicative weight.

As mentioned earlier, in step S31, threshold values $\theta_{s,t}$ are used to binarize the individual NCC maps $R_{i,j,s,t}^x$. Preferably, the threshold values are specific for different window size index s and image type t. These threshold values are important parameters of the ghost artifact detection algorithm, as they determine whether each pair of image windows is considered consistent or inconsistent. These threshold values are developed beforehand (i.e. "off-line") and stored in a memory of the camera or computer. According to an embodiment of the present invention, the threshold values are determined automatically from training data using a machine learning approach, described below with reference to FIG. 5.

First, a set of image window pairs (training data) are provided, with some pairs known to be consistent and some known to be inconsistent (step S51). In one implementation, to generate the training data, pairs of images of the same scene (without any ghost-inducing regions) taken at different exposures are used to generate known consistent window pairs; pairs of images of different scenes, also taken at different exposures, are used to generate known non-consistent window pairs. Then, a set of NCC values are calculated for the set of window pairs, both consistent and non-consistent ones (step S52). In practice, it is not required to actually create distinct pairs of image windows in step S51; for example, multiple smaller window pairs (e.g., 11×11 pixels) may be generated from one pair of larger sized images (e.g. 1000× 750 pixels) using moving windows.

A threshold value is obtained that maximizes a correctness score, i.e. a score that measures the correctness of classifying the window pairs as consistent or non-consistent using the threshold value (step S53). In one implementation, the correctness score is the $F_2$ score (Eq. 5):

$$F_2(\theta) = (1 + 2^2) \cdot \frac{p(\theta) \cdot r(\theta)}{2^2 \cdot p(\theta) + r(\theta)}$$

where $p(\theta)$ and $r(\theta)$ are respectively the precision (also called positive predictive value) and recall (also known as sensitivity) of the classification using threshold value $\theta$. $r(\theta)$ is the fraction of non-consistent pixels that are correctly classified as such, and $p(\theta)$ is the fraction of pixels classified as non-consistent that are indeed non-consistent. The definitions of precision and recall are generally discussed at http://en.wikipedia.org/wiki/Precision_and_recall. The threshold $\theta^*$ that maximizes the classification correctness score in Eq. 5 is selected as follows:

$$\theta^* = \arg_\theta \max F_2(\theta)$$

The optimization process is conducted via a systematic search through all the NCC values of the consistent and non-consistent window pairs; therefore, $\theta^*$ is a global optimal value on the training data.

Figure 7:
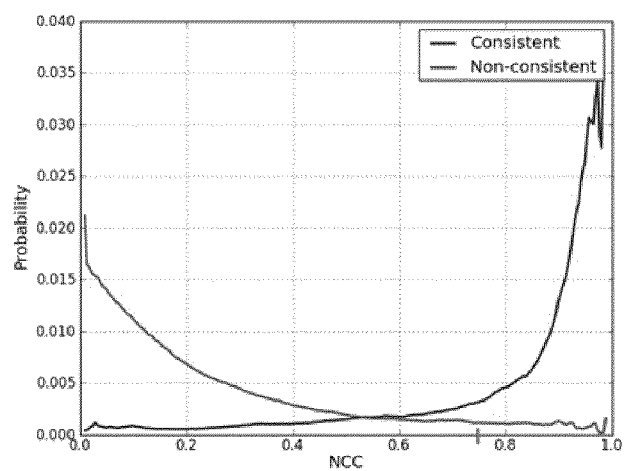
FIG. 7 shows exemplary distributions of consistency values for consistent and non-consistent pixels.

FIG. 7 shows exemplary distributions of NCC values for consistent and non-consistent pixels with a window of size 41×41 pixels, using a pair of consistent images and a pair of non-consistent images as described above. Negative NCC values are not shown here. The mark at NCC=0.75 indicates the value of θ* that maximizes the $F_2$ score for these exemplary distributions.

The above process is carried out for each window size index s and image type t to obtain the threshold values $\theta_{s,t}$ specific to the s and t. Table I below shows the threshold values for various window sizes (in number of pixels on each side) and image type (color and black-and-white) for one particular implementation of the present invention.

TABLE I

| Type | Size | | | | | | |
|---|---|---|---|---|---|---|---|
| | 7 | 11 | 21 | 41 | 81 | 101 | 201 |
| Color | 0.86 | 0.85 | 0.81 | 0.76 | 0.68 | 0.63 | 0.58 |
| BW | 0.61 | 0.58 | 0.57 | 0.57 | 0.58 | 0.58 | 0.57 |

Of course, these data are merely examples and other suitable values may be used.

If specific threshold values for different types of scenes (beach, indoor etc.) are to be provided, they can be obtained by using training images of the different types of scenes.

In summary, the ghost artifact detection and removal method described in this disclosure uses multiple window sizes to enhance detection results. In addition, it combines different image types, namely black and white and color, to enhance detection results. When combining the individual consistency maps into a combined map, the threshold values used to detect inconsistent areas in individual consistency maps are specific to the window size and image type. The threshold values can further be specific to types of scenes.

Further, in regions where normalized-cross correlation fails, e.g. regions with relatively uniform intensities, the method uses a different technique to determine consistency of non-consistency of images.

Another aspect of the ghost artifact detection and removal method described in this disclosure is that it does not require the use of a reference image, i.e., the image to which the other brackets are compared for ghost detection.

In the preferred embodiment described above, different window sizes are used to process fixed sized images to calculate NCC maps. However, the present invention is not limited to this implementation; windows of a single size can be applied to different sized images, where the different sized images are prepared by applying different down-sampling factors to the original images. In other words, the term "different window sizes" as used in this disclosure can mean that the window sizes are different relative to the images.

The ghost artifact removal methods described here can be implemented in a data processing system such as a computer 120 as shown in FIG. 8A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

The method may also be implemented in hardwired circuits, such as one or more chips within a digital camera. FIG. 8B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is well known and its details are omitted here. The processor 131 may process the set of images using the algorithm described above to generate an HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the ghost artifact detection and removal method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image from a set of multiple images at different exposure levels, comprising:
   for each pair of images of the set of images:
   (a) generating a plurality of individual consistency maps for the pair of images, each individual consistency map being generated by calculating a consistency function between a pair of moving windows having a window size and located respectively in the pair of images, the plurality of individual consistency maps being generated using a plurality of different window sizes;
   (b) combining the plurality of individual consistency maps to generate a combined consistency map for the pair of images; and
   (c) binarizing the combined consistency map to generate a final consistency map for the pair of images, wherein each pixel in the final consistency map has a pixel value indicating whether or not the pair of images are consistent with each other at a location corresponding to that pixel;
   whereby a plurality of final consistency maps are generated, one for each pair of images;
   (d) for each image of the set of images, generating a ghost-weight map based on the plurality of final consistency maps, wherein each pixel in the ghost-weight map has a pixel value indicating a likelihood of an image pixel at a corresponding location of the image being ghost-inducing; and
   (e) generating the HDR image using the set of images and the corresponding ghost-weight maps.

2. The method of claim 1, wherein in step (a), the plurality of individual consistency maps include individual consistency maps generated for color versions of the pair of images and black and white versions of the pair of images.

3. The method of claim 1, wherein in step (a), the consistency function is a normalized cross-correlation (NCC) function defined as:

$$NCC(X, Y) = \frac{\sum_{i=1}^{N}(X_i - \overline{X})(Y_i - \overline{Y})}{\sqrt{\left(\sum_{i=1}^{N}(X_i - \overline{X})^2 \sum_{i=1}^{N}(Y_i - \overline{Y})^2\right)}}$$

where X and Y are the pair of windows, where $$\bar{X} = \frac{1}{N}\sum_{i=1}^{N} X_i$$

and $$\bar{Y} = \frac{1}{N}\sum_{i=1}^{N} Y_i.$$

4. The method of claim 1, wherein in step (a), all image and all individual consistency maps have an identical size, wherein step (a) includes, for each individual consistency map:
  (a1) for each pixel located within an central area of (L−l+1)×(C−c+1) pixels of the individual consistency map, where L and C are linear dimensions of the images and l and c are linear dimensions of the moving window, calculating the consistency function using a pair of moving windows of linear dimensions l and c centered at the pixel; and
  (a2) for each pixel located within a border area of the individual consistency map outside of the central area, calculating the consistency function using a pair of incomplete moving windows, each incomplete moving window being a portion of a moving window of linear dimensions l and c centered at the pixel that is located within the image.

5. The method of claim 1, wherein in step (a), all image and all individual consistency maps have an identical size, wherein step (a) includes, for each individual consistency map:
  (a1) for each pixel located within an central area of (L−l+1)×(C−c+1) pixels of the individual consistency map, where L and C are linear dimensions of the images and l and c are linear dimensions of the moving window, calculating the consistency function using a pair of moving windows of linear dimensions l and c centered at the pixel; and
  (a2) padding a border area of the individual consistency map outside of the central area with pixel values representing inconsistency to generate a padded map;
  (a3) filtering the padded map using a blurring kernel to generate a filtered map; and
  (a4) normalizing the filtered map.

6. The method of claim 1, wherein in step (a), the consistency function between a pair of moving windows is calculated by:
  determining whether each moving window is uniform or non-uniform;
  if both moving windows are uniform, setting the consistency function to a value indicating consistent;
  if one moving window is uniform and the other moving window is non-uniform, setting the consistency function to a value indicating inconsistent;
  if both moving windows are non-uniform, calculating a normalized cross-correlation value of the pair of moving windows as the consistency function.

7. The method of claim 1, wherein step (b) includes:
  (b1) binarizing each individual consistency map using a predetermined threshold value to generate a plurality of binarized individual consistency map; and
  (b2) averaging the plurality of binarized individual consistency map to generate the combined consistency map.

8. The method of claim 7, wherein in step (b1), the predetermined threshold values are different for different individual consistency maps, and wherein the predetermined threshold values have been generated using a machine learning method and a set of training images.

9. The method of claim 1, further comprising, after step (c) and before step (d), adjusting the final consistency map for the pair of images based on a comparison of pixel values of corresponding pixels in the pair of images and a comparison of overall exposure levels of the pair of images.

10. The method of claim 1, wherein the set of images includes exactly three images, and wherein in step (d), the ghost-weight map for each image is calculated as $$G_i^x = (1-RB_{ij}^x) \cdot (1-RB_{ik}^x)$$

where i, j, k indicate the three images, where $G_i^x$ is the ghost-weight value for image i at pixel location x, and $RB_{ij}^x$ and $RB_{ik}^x$ are pixel values of the final consistency maps between image i and image j, and between image i and image k, respectively, at pixel location x.

11. The method of claim 1, wherein step (d) includes, for each image:
  (d1) generating a binary ghost-weight map based on the plurality of final consistency maps, each pixel of the binary ghost-weight map having a value indicating ghost-inducing or non-ghost-inducing;
  (d2) correcting the binary ghost-weight map for pixels that are under exposed or over exposed in the corresponding image;
  (d3) correcting the binary ghost-weight map for pixels that have a value indicating ghost-inducing in all ghost-weight maps; and
  (d4) blurring the binary ghost-weight map to generate a continuous-value ghost-weight map, wherein each pixel in the continuous-value ghost-weight map has a pixel value indicating a likelihood of being ghost-inducing.

12. A computer program product comprising a computer usable non-transitory medium having a computer readable program code embedded therein for controlling a data processing apparatus, the computer readable program code configured to cause the data processing apparatus to execute a process for generating a high dynamic range (HDR) image from a set of multiple images at different exposure levels, the process comprising:
  for each pair of images of the set of images:
    (a) generating a plurality of individual consistency maps for the pair of images, each individual consistency map being generated by calculating a consistency function between a pair of moving windows having a window size and located respectively in the pair of images, the plurality of individual consistency maps being generated using a plurality of different window sizes;
    (b) combining the plurality of individual consistency maps to generate a combined consistency map for the pair of images; and
    (c) binarizing the combined consistency map to generate a final consistency map for the pair of images, wherein each pixel in the final consistency map has a pixel value indicating whether or not the pair of images are consistent with each other at a location corresponding to that pixel;
  whereby a plurality of final consistency maps are generated, one for each pair of images;
  (d) for each image of the set of images, generating a ghost-weight map based on the plurality of final consistency maps, wherein each pixel in the ghost-weight map has a pixel value indicating a likelihood of an image pixel at a corresponding location of the image being ghost-inducing; and (e) generating the HDR image using the set of images and the corresponding ghost-weight maps.

13. The computer program product of claim 12, wherein in step (a), the plurality of individual consistency maps include individual consistency maps generated for color versions of the pair of images and black and white versions of the pair of images.

14. The computer program product of claim 12, wherein in step (a), the consistency function is a normalized cross-correlation (NCC) function defined as:

$$NCC(X, Y) = \frac{\sum_{i=1}^{N}(X_i - \overline{X})(Y_i - \overline{Y})}{\sqrt{\left(\sum_{i=1}^{N}(X_i - \overline{X})^2 \sum_{i=1}^{N}(Y_i - \overline{Y})^2\right)}}$$

where X and Y are the pair of windows, where $$\overline{X} = \frac{1}{N}\sum_{i=1}^{N} X_i$$

and $$\overline{Y} = \frac{1}{N}\sum_{i=1}^{N} Y_i.$$

15. The computer program product of claim 12, wherein in step (a), all image and all individual consistency maps have an identical size,
wherein step (a) includes, for each individual consistency map:
(a1) for each pixel located within an central area of (L−l+1)×(C−c+1) pixels of the individual consistency map, where L and C are linear dimensions of the images and l and c are linear dimensions of the moving window, calculating the consistency function using a pair of moving windows of linear dimensions l and c centered at the pixel; and
(a2) for each pixel located within a border area of the individual consistency map outside of the central area, calculating the consistency function using a pair of incomplete moving windows, each incomplete moving window being a portion of a moving window of linear dimensions l and c centered at the pixel that is located within the image.

16. The computer program product of claim 12, wherein in step (a), all image and all individual consistency maps have an identical size,
wherein step (a) includes, for each individual consistency map:
(a1) for each pixel located within an central area of (L−l+1)×(C−c+1) pixels of the individual consistency map, where L and C are linear dimensions of the images and l and c are linear dimensions of the moving window, calculating the consistency function using a pair of moving windows of linear dimensions l and c centered at the pixel; and
(a2) padding a border area of the individual consistency map outside of the central area with pixel values representing inconsistency to generate a padded map;
(a3) filtering the padded map using a blurring kernel to generate a filtered map; and
(a4) normalizing the filtered map.

17. The computer program product of claim 12, wherein in step (a), the consistency function between a pair of moving windows is calculated by:
determining whether each moving window is uniform or non-uniform;
if both moving windows are uniform, setting the consistency function to a value indicating consistent;
if one moving window is uniform and the other moving window is non-uniform, setting the consistency function to a value indicating inconsistent;
if both moving windows are non-uniform, calculating a normalized cross-correlation value of the pair of moving windows as the consistency function.

18. The computer program product of claim 12, wherein step (b) includes:
(b1) binarizing each individual consistency map using a predetermined threshold value to generate a plurality of binarized individual consistency map; and
(b2) averaging the plurality of binarized individual consistency map to generate the combined consistency map.

19. The computer program product of claim 18, wherein in step (b1), the predetermined threshold values are different for different individual consistency maps, and wherein the predetermined threshold values have been generated using a machine learning method and a set of training images.

20. The computer program product of claim 12, wherein the process further comprises, after step (c) and before step (d), adjusting the final consistency map for the pair of images based on a comparison of pixel values of corresponding pixels in the pair of images and a comparison of overall exposure levels of the pair of images.

21. The computer program product of claim 12, wherein the set of images includes exactly three images, and wherein in step (d), the ghost-weight map for each image is calculated as $$G_i^x = (1 - RB_{ij}^x) \cdot (1 - RB_{ik}^x)$$

where i, j, k indicate the three images, where $G_i^x$ is the ghost-weight value for image i at pixel location x, and $RB_{ij}^x$ and $RB_{ik}^x$ are pixel values of the final consistency maps between image i and image j, and between image i and image k, respectively, at pixel location x.

22. The computer program product of claim 12, wherein step (d) includes, for each image:
(d1) generating a binary ghost-weight map based on the plurality of final consistency maps, each pixel of the binary ghost-weight map having a value indicating ghost-inducing or non-ghost-inducing;
(d2) correcting the binary ghost-weight map for pixels that are under exposed or over exposed in the corresponding image;
(d3) correcting the binary ghost-weight map for pixels that have a value indicating ghost-inducing in all ghost-weight maps; and
(d4) blurring the binary ghost-weight map to generate a continuous-value ghost-weight map, wherein each pixel in the continuous-value ghost-weight map has a pixel value indicating a likelihood of being ghost-inducing.

23. A digital camera comprising the computer program product of claim 12, the digital camera further comprising:
an imaging section for obtaining images; and
a control section for controlling the imaging section to obtain the set of images having different exposure levels.

* * * * *